United States Patent
Lacroix

(10) Patent No.: US 6,786,230 B2
(45) Date of Patent: Sep. 7, 2004

(54) VALVE LOCK

(76) Inventor: Maurice Lacroix, 109 bisson, Windsor, QC (CA), J1S 1P7

(*) Notice: Subject to any disclaimer, the term of this patent is extended or adjusted under 35 U.S.C. 154(b) by 0 days.

(21) Appl. No.: 10/351,749

(22) Filed: Jan. 27, 2003

(65) Prior Publication Data

US 2004/0144426 A1 Jul. 29, 2004

(51) Int. Cl.[7] ............................................... F18K 35/00
(52) U.S. Cl. ......................... 137/385; 137/383; 70/180
(58) Field of Search ................................ 137/385, 383; 70/180

(56) References Cited

U.S. PATENT DOCUMENTS

| 1,432,621 A | 10/1922 | Rath |
| 1,592,835 A | * 7/1926 | Mock et al. ................. 137/383 |
| 1,986,128 A | 1/1935 | Trott |
| 2,161,509 A | 6/1939 | Father |
| 2,324,633 A | * 7/1943 | McCarthy et al ........... 137/383 |
| 2,399,578 A | * 4/1946 | Smith .......................... 137/383 |
| 3,532,111 A | 10/1970 | Hansen |
| 4,397,332 A | 8/1983 | Sample |
| 5,353,833 A | 10/1994 | Martinez |

FOREIGN PATENT DOCUMENTS

| FR | 851923 | 1/1940 |
| GB | 2074291 | 10/1981 |

* cited by examiner

Primary Examiner—A. Michael Chambers

(57) ABSTRACT

A valve lock to lock gate valves having a truss.

3 Claims, 3 Drawing Sheets

VALVE LOCK

BACKGROUND OF THE INVENTION

1. Field of the Invention

The present invention relates to locking systems in general but more particularly to valve locking systems to eliminate tampering.

2. Description of the Prior Art

Industrial valves are utilized for the purpose of adjusting the flow of steam or liquids. It is often necessary to position valves at specific settings, whether closed, opened or any settings in between and then to make sure that a particular setting is not tampered in any way. To do that, workers have long had to resort to using chains with locks or even sticks with written warnings, but these methods are less than satisfactory. To solve this problem, a number of locking devices have been developped. Unfortunately, because of the large variety of valve types, shapes and sizes, a device meant for one type of valve may not work for another. Therefore, no single valve lock is universal and there is still a need for a new type of valve lock.

SUMMARY OF THE INVENTION

The valve lock of this instant invention is appropriate for gate valves and provides a simple yet efficient device that can be locked using a standard padlock. The valve lock is a curved U shaped element that is inserted around the threaded spindle of the valve and in between the legs of the U shaped truss that joins the lower portion of the valve with the handle. The padlock is inserted through a pair of holes at the top of the valve lock which, when installed, is just above the gate valve handle.

It is a first object of this invention to provide for an easily mountable and unmountable valve lock.

It is a second object of this invention to provide for a gate lock designed to work with gate valves having a truss.

It is a final object of this invention to provide for a gate lock that is secure and tamper proof.

The foregoing and other objects, features, and advantages of this invention will become more readily apparent from the following detailed description of a preferred embodiment with reference to the accompanying drawings, wherein the preferred embodiment of the invention is shown and described, by way of examples. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE PREFERRED EMBODIMENT

Figure 1:
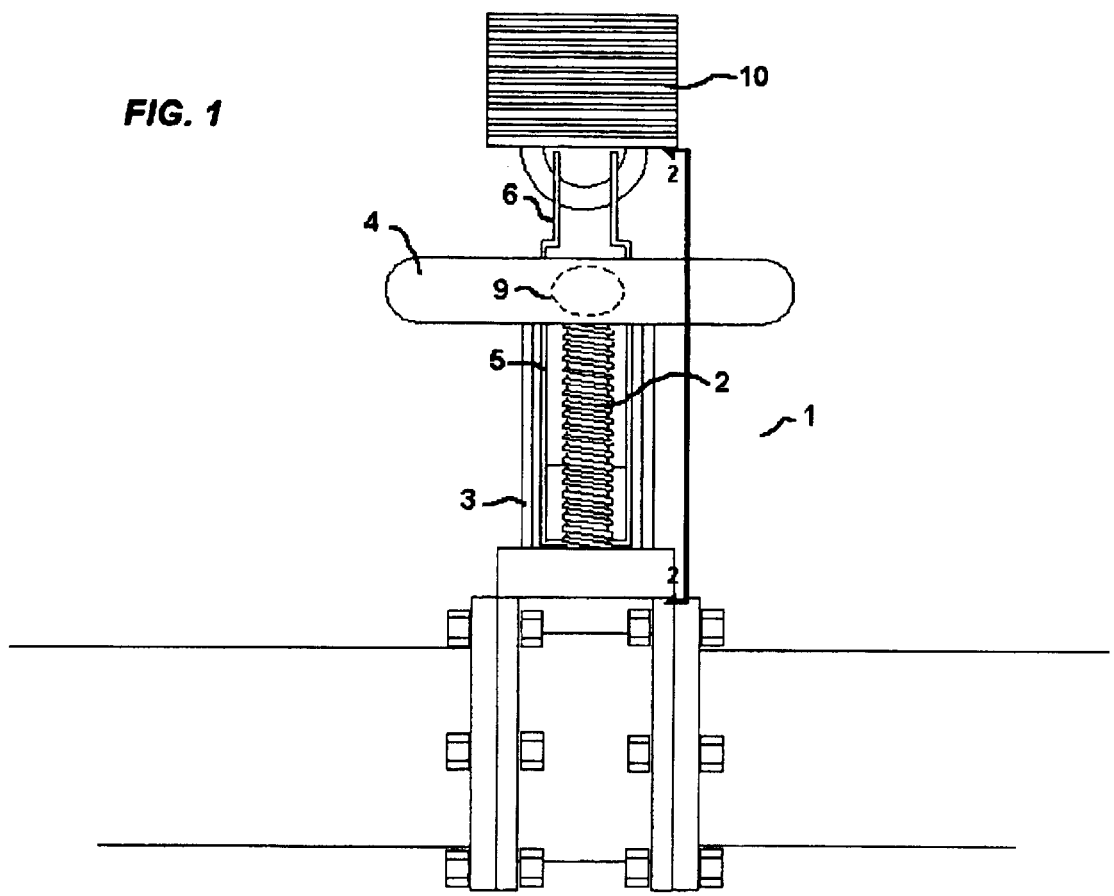
FIG. 1 is a front elevation of a gate valve with the gate lock inserted.

FIG. 1 A gate valve 1 is comprised of a threaded stem 2, a U shaped truss 3 and a handle 4. A valve lock 5, shaped like an "L" as viewed from one plane and a "U" as seen from a plane perpendicular to the first one, is slipped around the stem 2 and between the legs of the "U" shaped truss 3 and then rotated upwards so that a locking end 6 can pass around one of the arms 9 of the handle 4 so that it lays just above the handle 4. A locking device 10 is inserted into the locking end 6 to lock the valve lock 5. Once the valve lock 5 is secured, the handle 4 cannot be moved appreciably.

Figure 2:
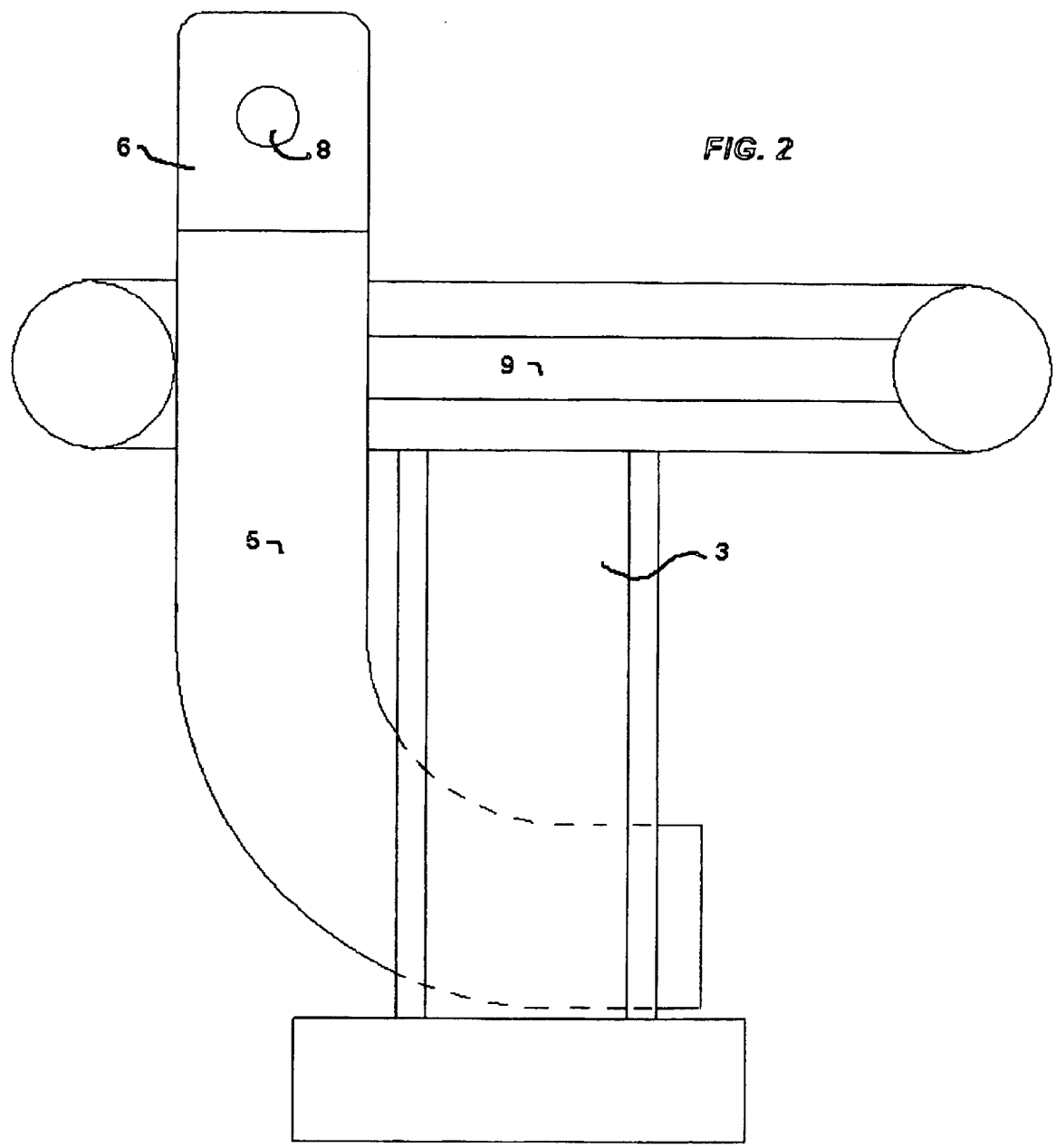
FIG. 2 is a side elevation of a gate valve with the gate lock inserted.

FIG. 2 In this side view, the shape of the gate lock 5 is clearer as well as the way it is inserted between the U shaped truss 3 and one arm 9. Holes 8, one for each side of the locking end 6, allow for the insertion of the locking device 10.

Figure 3:
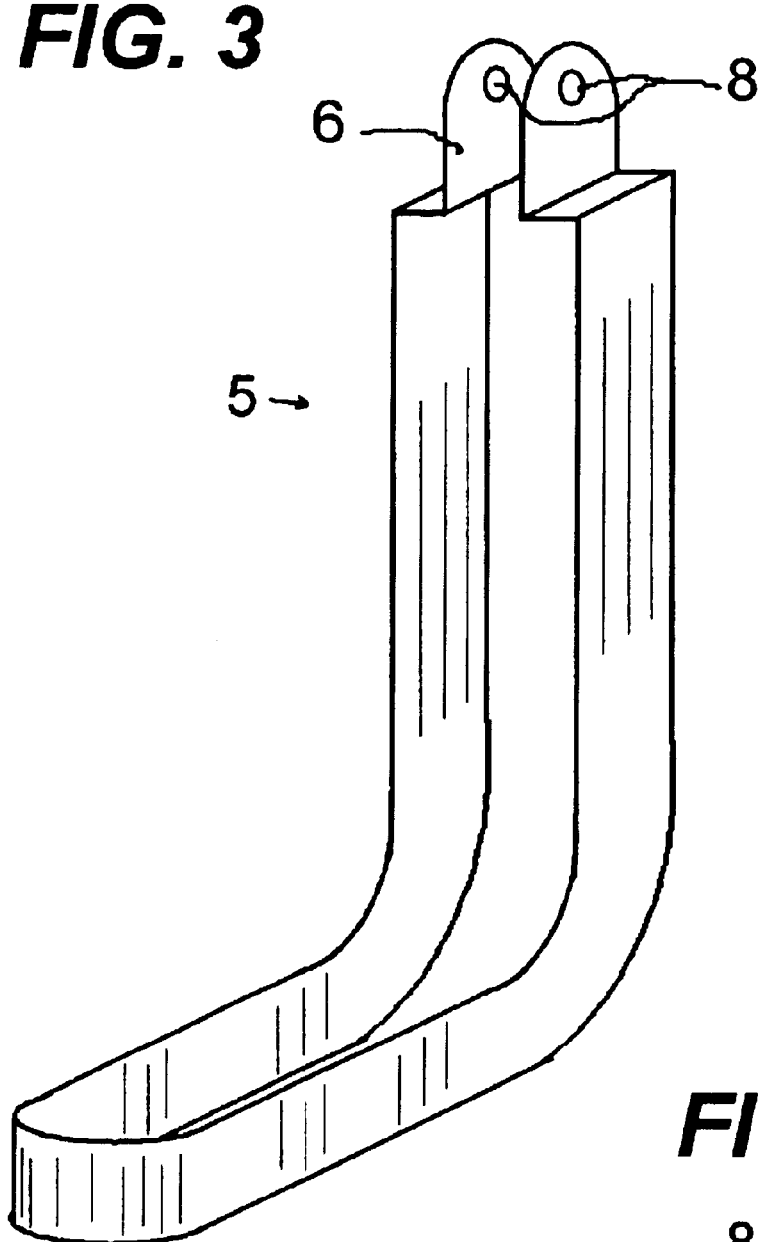
FIG. 3 is a perspective elevation of the valve lock alone.

FIG. 3 This perspective elevation shows the curved U shape form of the gate lock 5 with its holes 8 on each side of the locking end 6. The locking end 6 is preferably but not necessarily narrower than the rest of the valve lock 5 to accomodate the padlock 10 (not shown). Given the various sizes of valves, different sizes of valve locks 5 may be required, some too large to accomodate medium sized padlocks, therefore the narrowing at the locking end 6 could be useful in some cases.

Figure 4:
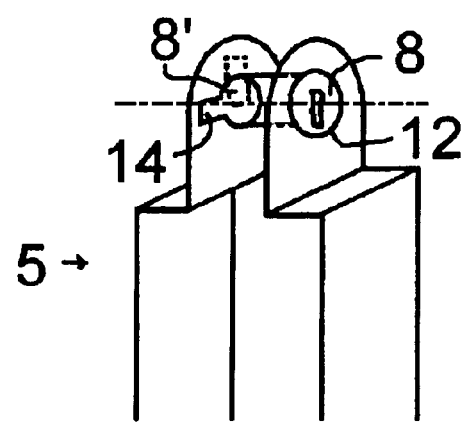
FIG. 4 is a perspective elevation of the valve lock with an alternate type of locking device.

FIG. 4 It should be understood that although a standard padlock is used to illustrate the locking device 10 other types of locks can be used including those that can be assembled as part of the valve lock 5 such as locking devices commonly found to lock post office boxes for example. In such a situation, one of the holes 8 would be occupied with the alternate locking device 12 while the other hole 8' would be shaped irregularly in a shape meant to both allow and disallow passage of a locking stem 14 depending upon its orientation.

What is claimed is:

1. A valve lock for locking gate valves comprising:
   a width and a length with two spaced apart parrallel sides, a curved "L" shape, a "U" shape base, two opposite ends and holes;
   as seen from a first plane the valve lock has an upper end where the two said parallel sides are separate and said upper end has one hole into each of the parallel sides and said holes allow passage for a locking device;
   the "U" shape base is opposite the upper end, where the two said parallel sides meet like the base of the letter "U";
   in a perpendicular plane from the first plane taken lengthwise, the valve lock presents its curved "L" shape.

2. A valve lock for locking gate valves as in claim 1 further comprising:
   an upper end where its parallel sides are set closer together than the rest of the valve lock.

3. A valve lock for locking gate valves as in claim 1 wherein:
   the holes meant to allow passage of a locking device are used for integrating a "post office box" type lock.

* * * * *